March 18, 1958     C. SCHULZE     2,826,932
STEERING GEARS PARTICULARLY FOR MOTOR VEHICLES
Filed Oct. 31, 1952
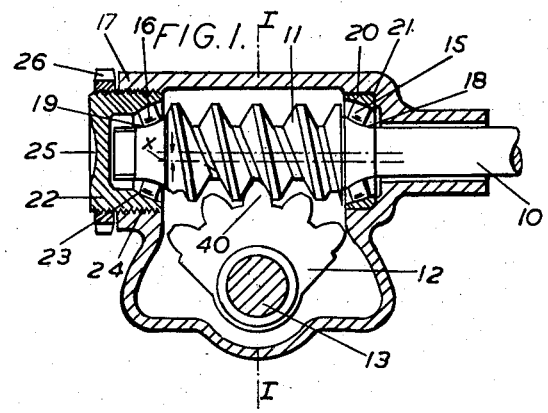
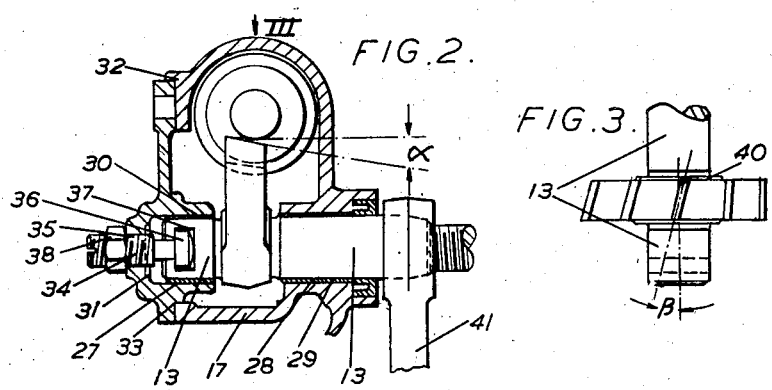
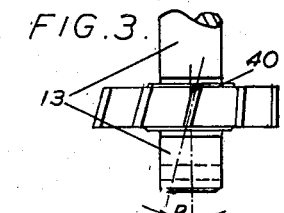
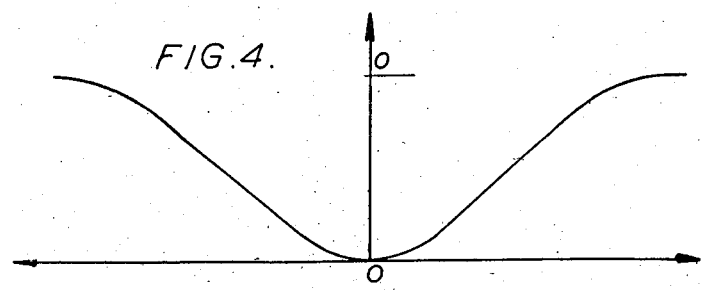
Inventor
Carl Schulze
By
Willits, Helwig & Baillio
Attorneys

United States Patent Office 2,826,932
Patented Mar. 18, 1958

2,826,932

STEERING GEARS PARTICULARLY FOR MOTOR VEHICLES

Carl Schulze, Wiesbaden, Germany, assignor to General Motors Corporation, Detroit, Mich., a corporation of Delaware Application October 31, 1952, Serial No. 318,115

6 Claims. (Cl. 74—500)

This invention relates to steering gears, particularly for motor vehicles. Such gears by which the movements of a steering hand wheel are transmitted to the road wheels usually comprise a worm gear, and a toothed intermeshing segment therewith.

It is the main object of the present invention to improve such a steering gear such that though it is operated with great ease, it gives to the driver a definite feel of the extent of the steering movement, and yet is a neat and compact construction and is cheaper to manufacture than known gears of this type.

This is accomplished by making the back-lash between the component parts of the gear a minimum at "zero position" of the gear (that is, at a position coinciding with the straight-ahead position of the road wheels) and by increasing back-lash gradually to a maximum on either side of the "zero position."

Preferably this is done by so shaping the teeth of the segment that a predetermined back-lash is obtained in relation to the position of the steering road wheels.

A further feature of the invention is that the worm is made eccentric in relation to the centre line of the worm bearings whereby advantages in the manufacture of the steering gear are obtained, as explained below.

The invention is defined by the appended claims; and one embodiment of the invention is described in detail by way of example with reference to the accompanying drawings in which:

Figure 1 is a longitudinal section through a steering gear according to the invention;

Figure 2 is a section along line I—I of Figure 1;

Figure 3 is a view of the segment in the direction of the arrow III of Figure 2;

Figure 4 is a diagram showing the variation of back-lash with steering angle in degrees of hand wheel rotation.

The mechanism shown in Figures 1 to 3 of the drawings is adapted to be mounted in conventional manner at the lower end of the steering column (not shown) on the motor vehicle.

Steering movements are transferred from the steering hand wheel (not shown) through the rotatable steering shaft 10 to a cylindrical worm 11 and from there to the gear segment 12 which is integral with the cross-shaft 13 which carries at its end a pitman arm 41 by which the steering movement is transmitted to the linkage and to the road wheels (not shown). The cylindrical worm 11 is supported in the housing 17 by two roller bearings 15 and 16, which contact with the worm adjacent the ends of the worm threads around integrally formed curved races 18 and 19. By these races 18 and 19, the larger diameter of the worm is reduced to the diameter of the steering shaft without abrupt changes of cross section.

The rollers 15 engage an outer race 20 which is inserted in an opening 21 of the housing 17. The rollers 16 similarly engage a race 23 formed in a bearing cap 22 which has an external thread 24 by which it is screwed into the housing 17, the cap 22 also having a slot 25 for a screw driver or the like. An outer nut 26 holds the cap 22 in the adjusted position.

The thread of the worm 11 is not made concentric with the centre line of the bearings 15 and 16: as indicated in Figure 1, the axis of the worm 11 has an eccentricity X towards the segment 12, relative to the centre-line of the bearings 15, 16 when the steering gear is in its centre or zero position. The segment 12 and shaft 13 are supported in the housing by bushings 27 and 28 (Figure 2): the bushing 28 is inserted in an opening 29 of the housing, while the bushing 27 rests in an opening 30 of the cover 31. The cover 31 is located on the housing 17 by recesses 32 and 33 and is attached to the housing by normal cap screws (not shown). The axial adjustment of the segment is made in known manner by a screw bolt 34, which is screwed into the bore 35 in the cover 31 with its head 36 inserted in a transverse slot 37 of the cross-shaft 13. When the back lash is adjusted by screwing this bolt in or out of the cover 31, it is fixed in the adjusted position by a nut 38. In order to keep the axial adjustment of the segment as small as possible, the teeth of the segment are cut on an angle (Figure 2) and are also skewed by an angle (Figure 3). By forming the teeth of the segment in this manner they rapidly increase in thickness axially, from one side of the sector to the other.

In the steering gear according to this invention, the centre tooth 40 of the segment 12 is made stronger than the two teeth on either side thereof. Hereby it is possible to adjust the gear so that there is no back-lash in the steering gear in its centre position. This is accomplished by generating the segmental teeth with a standard hob but changing the centre distance during the generation of the involute. Hereby a back-lash is obtained which increases relative to the rotation of the steering hand wheel, on each side of the zero position, as shown by the ordinates in Figure 4.

In generating the worm, manufacturing tolerances must be accounted for, which result in deviations of the worm relative to the centre line of the steering shaft or relative to the centre line of its bearings and these deviations may be in any direction from the centre line. Such uncontrollable deviations would disturb the exact form of the curve shown in Figure 4 and would therefore be detrimental to the object of the present invention. Provision is therefore made by this invention to bias these manufacturing tolerances to one direction only, namely, in the direction of the centre line of the shaft of the segment. This is accomplished in generating the worm eccentric by a predetermined eccentricity X referred to above. This eccentricity should be equal or greater than any allowable tolerances of the worm. However, its magnitude should not be such as to essentially affect the back-lash curve shown by Figure 4. Preferably the eccentricity is about 0.05 mm.

Hereby it is made possible to adjust the steering gear so that at "zero position" or "straight-ahead position" of the road wheels, there is no back-lash between the flanges of the segment tooth 40 and the worm 11; and that with a left or right rotation of the steering hand wheel from this zero position the back-lash between the teeth of segment and the worm increases gradually, according to the curve in Figure 4.

Thus the driver, in driving straight ahead experiences no back-lash, and the gear reacts immediately to any rotation of the steering hand wheel which is operated with great ease and at high efficiency. Steering gears according to this invention greatly improve the safety in steering motor vehicles.

I claim:

1. A motor vehicle steering gear comprising a rotatable shaft, a worm eccentrically disposed on said shaft, a rotatable cross-shaft, and a toothed sector on said cross-shaft meshing with said worm, the teeth on said sector being shaped such that in the median meshed position there is no back-lash between said worm and sector, but upon rotation of said worm in either direction from said median position the back-lash increases gradually to a maximum, said steering gear being further characterized in that the eccentricity of said worm is in a direction toward said sector when said worm and said sector are in their said median meshed position.

2. A motor vehicle steering gear comprising a rotatable shaft, a worm eccentrically disposed on said shaft, a rotatable cross-shaft, and a toothed sector on said cross-shaft meshing with said worm, the teeth on said sector being cut on an angle relative to the axis of said cross-shaft such that in the median meshed position there is no back-lash between said worm and sector but upon rotation of said worm in either direction from said median position the back-lash increases gradually to a maximum, said steering gear being further characterized in that the eccentricity of said worm is in a direction toward said sector when said worm and said sector are in their said median meshed position.

3. A motor vehicle steering gear comprising a rotatable shaft, a worm eccentrically disposed on said shaft, a rotatable and axially adjustable cross-shaft, and a toothed sector on said cross-shaft meshing with said worm, the teeth on said sector being cut on an angle relative to the axis of said cross-shaft such that in the median meshed position there is no back-lash between said worm and sector but upon rotation of said worm in either direction from said median position the back-lash increases gradually to a maximum, said steering gear being further characterized in that the eccentricity of said worm is in a direction toward said sector when said worm and said sector are in their said median meshed position.

4. A motor vehicle steering gear comprising a rotatable shaft, a rotatable cross-shaft adjustable axially, a worm eccentrically disposed on said shaft and a toothed sector on said cross-shaft meshing with said worm, the teeth on said sector being cut to involute shape on an angle and on the skew relative to the axis of said cross-shaft such that in the median meshed position there is no back-lash between said worm and sector but upon rotation of said worm in either direction from said median position the back-lash increases gradually to a maximum, said steering gear being further characterized in that the eccentricity of said worm is in a direction toward said sector when said worm and said sector are in their said median meshed position.

5. In a motor vehicle steering gear, a rotatable steering shaft including a worm thereon eccentric to the axis of rotation of said steering shaft, and a rotatable cross shaft including a toothed sector having its teeth cut to an involute shape on the skew and on an angle relative to the axis of the cross shaft so that when the worm is turned to a position of maximum eccentricity toward the cross shaft and the toothed sector is in a median meshed position there is no back-lash between said worm and sector but upon rotation of the worm in either direction from said maximum position of eccentricity the back-lash is increased gradually to a maximum.

6. In a motor vehicle steering gear, a rotatable steering shaft including a worm thereon eccentric to the axis of rotation of said steering shaft, a rotatable cross shaft including a toothed sector having its teeth cut to an involute shape on the skew and on an angle relative to the axis of the cross shaft so that when the worm is turned to a position of maximum eccentricity toward the cross shaft and the toothed sector is in a median meshed position there is no back-lash between said worm and sector but upon rotation of the worm in either direction from said maximum position of eccentricity the back-lash is increased gradually to a maximum, and means for adjusting said cross shaft axially to attain such no back-lash position between said worm and sector whereby to compensate for accumulated manufacturing tolerances and wear.

References Cited in the file of this patent
UNITED STATES PATENTS

| | | |
|---|---|---|
| 893,032 | Sweet | July 14, 1908 |
| 1,334,498 | Kelly | Mar. 23, 1920 |
| 1,847,721 | Marles | Mar. 1, 1932 |
| 1,905,484 | McCall | Apr. 25, 1933 |
| 2,004,374 | Marles | June 11, 1935 |
| 2,404,378 | Hoffar | July 23, 1946 |